(12) United States Patent
Mobley

(10) Patent No.: US 9,216,678 B1
(45) Date of Patent: Dec. 22, 2015

(54) HEEL PROTECTING VEHICLE FLOOR MAT DEVICE

(71) Applicant: Tyanne Mobley, O'Fallon, IL (US)

(72) Inventor: Tyanne Mobley, O'Fallon, IL (US)

( * ) Notice: Subject to any disclaimer, the term of this patent is extended or adjusted under 35 U.S.C. 154(b) by 0 days.

(21) Appl. No.: 14/317,386

(22) Filed: Jun. 27, 2014

(51) Int. Cl.
*B60N 3/04* (2006.01)
*B60N 3/06* (2006.01)
*G05G 1/60* (2008.04)

(52) U.S. Cl.
CPC *B60N 3/04* (2013.01); *B60N 3/048* (2013.01); *B60N 3/06* (2013.01); *G05G 1/60* (2013.01)

(58) Field of Classification Search
CPC ........... B60N 3/04; B60N 3/06; B60N 3/042; B60N 3/044; B60N 3/046; B60N 3/048063; B60N 3/066
USPC ................................. 296/75, 97.23; D12/203
See application file for complete search history.

(56) References Cited

U.S. PATENT DOCUMENTS

| | | | |
|---|---|---|---|
| 3,114,272 A | 12/1963 | Sawyer | |
| 4,262,048 A | 4/1981 | Mitchell | |
| 4,749,602 A | 6/1988 | Russell | |
| 4,810,024 A * | 3/1989 | Heller | 296/97.23 |
| 4,910,061 A * | 3/1990 | St. Julian | 428/95 |
| 4,991,900 A * | 2/1991 | White | 296/75 |
| 5,215,348 A * | 6/1993 | Wen-Hwang | 296/97.23 |
| 5,236,241 A * | 8/1993 | Courrege | 296/97.23 |
| 5,725,926 A * | 3/1998 | Wang | 428/78 |
| D413,850 S * | 9/1999 | Wang | D12/203 |
| 6,155,629 A * | 12/2000 | Sherman | 296/97.23 |
| D455,384 S | 4/2002 | Kraines | |
| 6,605,333 B2 * | 8/2003 | Ferreira et al. | 428/95 |
| 6,677,027 B1 * | 1/2004 | Lu | 428/138 |
| D491,122 S * | 6/2004 | Kraines | D12/203 |
| 6,794,013 B1 * | 9/2004 | Iacovelli et al. | 428/120 |
| 7,017,978 B2 * | 3/2006 | Murakami et al. | 296/187.05 |
| 7,449,228 B2 | 11/2008 | Mason | |
| D648,253 S * | 11/2011 | Lu | D12/203 |
| D680,932 S * | 4/2013 | Lu | D12/203 |
| 8,851,551 B1 * | 10/2014 | Kaufman et al. | 296/97.23 |
| 2006/0019057 A1 * | 1/2006 | Mason | 428/88 |
| 2010/0251883 A1 * | 10/2010 | Naroditsky | 89/36.02 |
| 2012/0019022 A1 * | 1/2012 | Cianci | 296/97.23 |
| 2014/0103680 A1 * | 4/2014 | Ikeno et al. | 296/97.23 |

* cited by examiner

*Primary Examiner* — Gregory Blankenship

(57) ABSTRACT

A heel protecting vehicle floor mat device for protecting a heel of a user's footwear from abrasion while driving. The device includes a mat having a front section, a back section, and a medial section positioned between the front section and the back section. The front section is narrower than the back section for positioning on a floor of a vehicle such that the front section extends under pedals of the vehicle. Each of a plurality of pads extends upwardly from the mat positioned in spaced relationship to a front edge of the front section of the mat wherein the pads are configured for positioning to support a heel of a driver of the vehicle.

10 Claims, 3 Drawing Sheets

HEEL PROTECTING VEHICLE FLOOR MAT DEVICE

BACKGROUND OF THE DISCLOSURE

Field of the Disclosure

The disclosure relates to floor mat devices and more particularly pertains to a new floor mat device for protecting a heel of a user's footwear from abrasion while driving.

SUMMARY OF THE DISCLOSURE

An embodiment of the disclosure meets the needs presented above by generally comprising a mat having a front section, a back section, and a medial section positioned between the front section and the back section. The front section is narrower than the back section for positioning on a floor of a vehicle such that the front section extends under pedals of the vehicle. Each of a plurality of pads extends upwardly from the mat positioned in spaced relationship to a front edge of the front section of the mat wherein the pads are configured for positioning to support a heel of a driver of the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
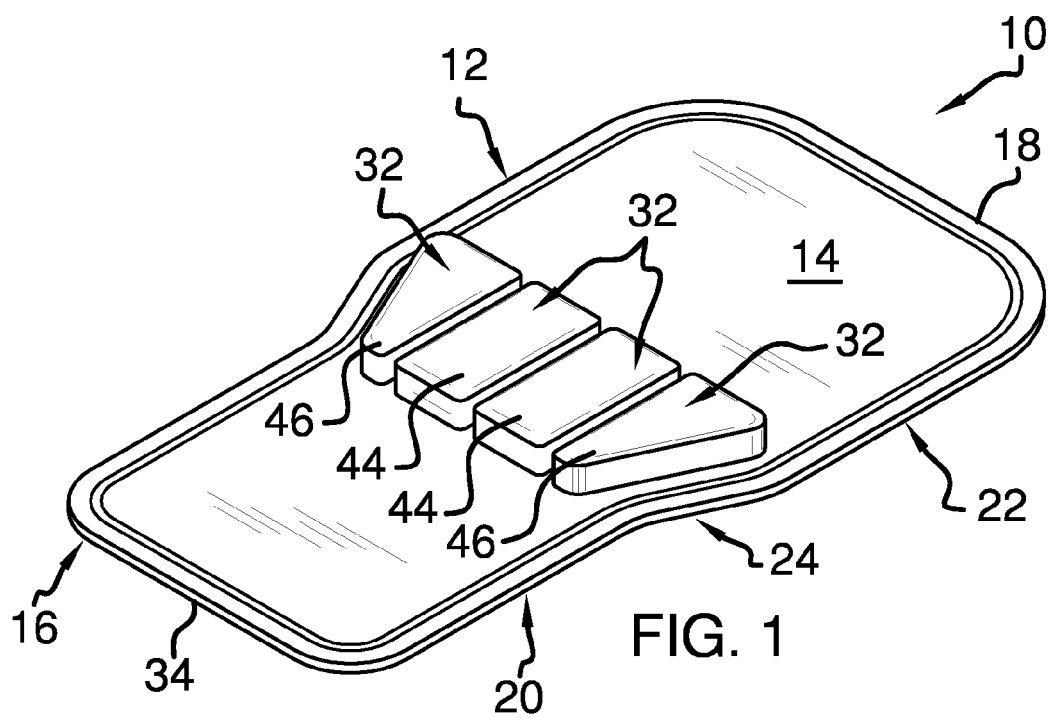
FIG. 1 is a top front side perspective view of a heel protecting vehicle floor mat device according to an embodiment of the disclosure.
Figure 2:
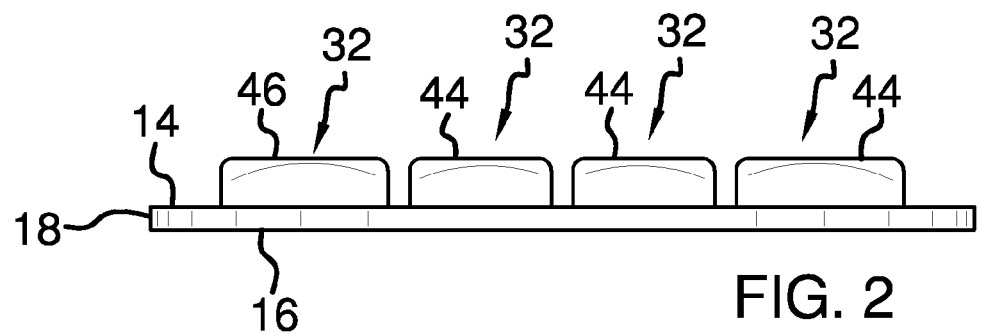
FIG. 2 is a back view of an embodiment of the disclosure.
Figure 3:
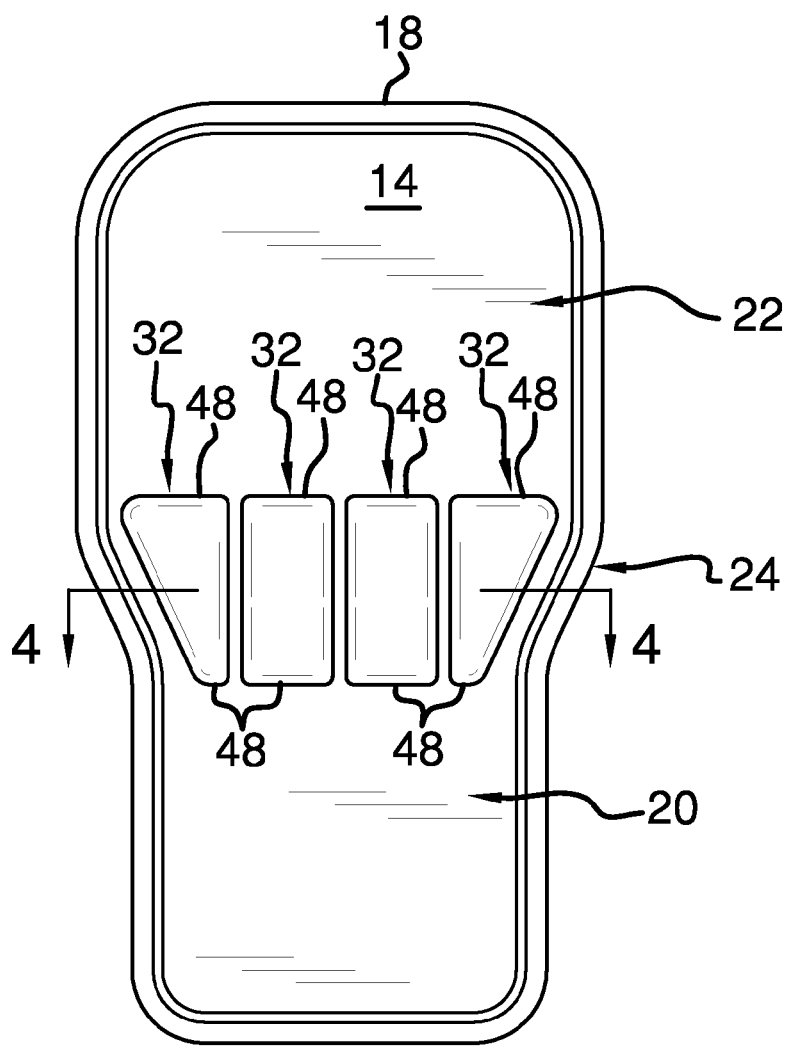
FIG. 3 is a top view of an embodiment of the disclosure.
Figure 4:
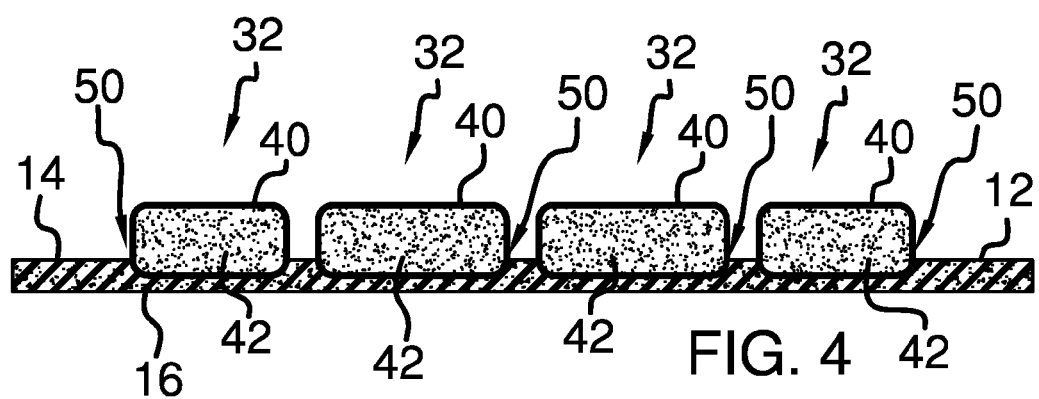
FIG. 4 is a cross-sectional view of an embodiment of the disclosure taken along line 4-4 of FIG. 3.
Figure 5:
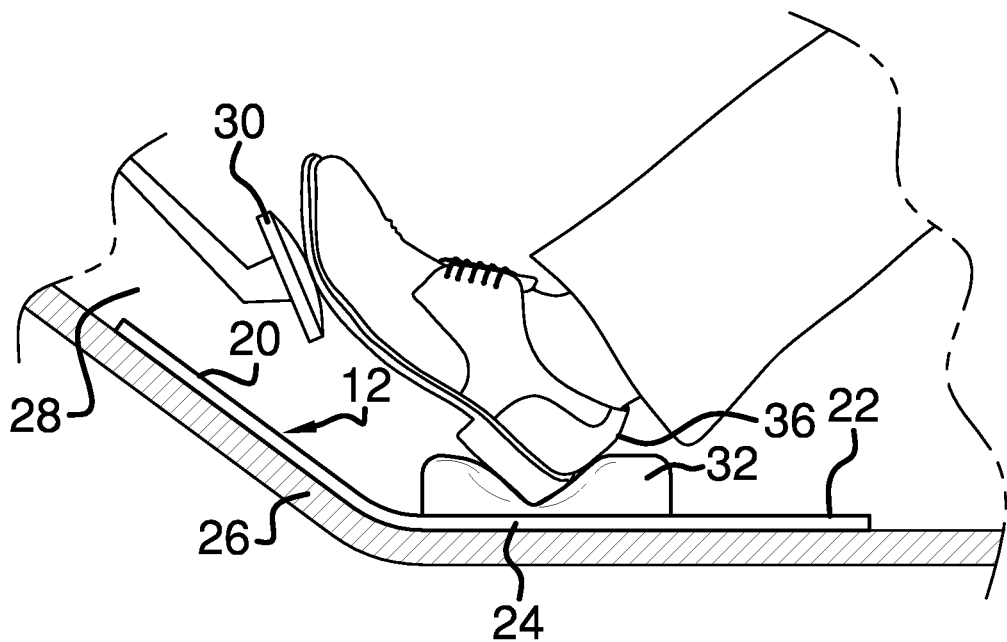
FIG. 5 is a side view of an embodiment of the disclosure in use.
Figure 6:
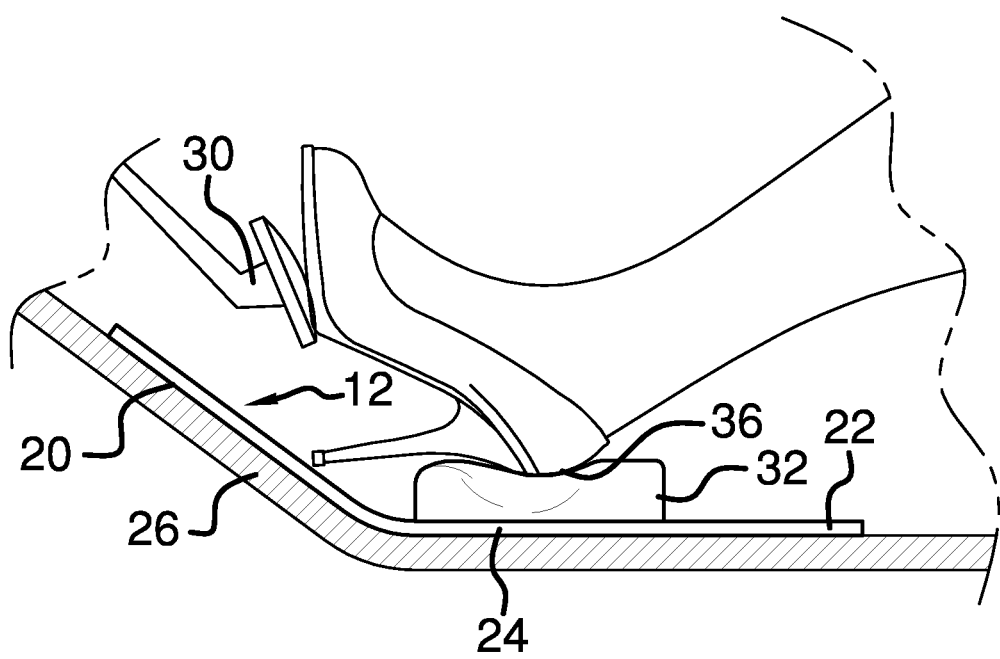
FIG. 6 is a side view of an embodiment of the disclosure in use.

With reference now to the drawings, and in particular to FIGS. 1 through 6 thereof, a new floor mat device embodying the principles and concepts of an embodiment of the disclosure and generally designated by the reference numeral 10 will be described.

As best illustrated in FIGS. 1 through 6, the heel protecting vehicle floor mat device 10 generally comprises a mat 12 having an upper surface 14, a lower surface 16, and a perimeter edge 18 extending around and between the upper surface 14 and the lower surface 16. The mat 12 has a front section 20, a back section 22, and a medial section 24 positioned between the front section 20 and the back section 22. The front section 20 is narrower than the back section 22 wherein the front section 20 is configured for positioning on a floor 26 of a vehicle 28 such that the front section 20 extends under pedals 30 of the vehicle 28. The medial section 24 tapers extending from the back section 22 to the front section 20.

Each of a plurality of pads 32 is coupled to the mat 12. The pads 32 are positioned to extend across the medial section 24 of the mat 12. The pads extend upwardly from the upper surface 14 of the mat 12. The pads 32 is positioned in spaced relationship to a front edge 34 of the front section 20 of the mat 12 wherein the pads 32 are configured for positioning to support a heel 36 of a driver of the vehicle 28. Each of the pads 32 is resiliently compressible to generally conform to the heel 36. Each of the pads 32 has an outer layer 40 enveloping a core 42. The core 42 may be constructed of a gel material of a conventional type providing resilience and deformable compression. The outer layer 40 may comprise a conventional material inhibiting scuffing of the heel 36. The pads 32 comprise a pair of interior pads 44. Each of the interior pads 44 has a rectangular shape. The pads 32 may further comprise a pair of outer pads 46. Each of the outer pads 46 has a triangular shape. Each of the pads 32 has opposite ends 48 extending beyond the medial section 24 such that each of the opposite ends 48 extends into one of the front section 20 and the back section 22.

Each of a plurality of depressions 50 extends into the upper surface 14 of the mat 12. Each of the pads 32 is positioned in an associated one of the depressions 50. Each pad 32 fully occupies the associated depression 50 and extends upwardly out of the associated depression 50.

In use, the mat 12 is positioned in the vehicle 28 in the same manner as a conventional floor mat. The pads 32 are positioned to abut and support the heel 36 of the driver in a manner protecting the surface of the heel 36.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A heel protecting vehicle floor mat device comprising:
a mat having an upper surface, a lower surface, and a perimeter edge extending around and between said upper surface and said lower surface, said mat having a front section, a back section, and a medial section positioned between said front section and said back section, said front section being narrower than said back section wherein said front section is configured for positioning on a floor of a vehicle such that said front section extends under pedals of the vehicle;

a plurality of pads coupled to said mat, said pads extending upwardly from said upper surface of said mat, said pads being positioned in spaced relationship to a front edge of said front section of said mat wherein said pads are configured for positioning to support a heel of a driver of the vehicle; and a plurality of depressions extending into said upper surface of said mat, each of said pads being positioned in an associated one of said depressions.

2. The device of claim 1, further comprising each of said pads being resiliently compressible.

3. The device of claim 1, further comprising each of said pads having an outer layer enveloping a core.

4. The device of claim 3, further comprising said core being constructed of a gel material.

5. The device of claim 1, further comprising said pads comprising a pair of interior pads, each of said interior pads having a rectangular shape.

6. The device of claim 1, further comprising said pads comprising a pair of outer pads, each of said outer pads having a triangular shape.

7. The device of claim 1, further comprising said medial section tapering extending from said back section to said front section, said pads being positioned to extend across said medial section of said mat.

8. The device of claim 7, further comprising each of said pads having opposite ends extending beyond said medial section such that each of said opposite ends extends into one of said front section and said back section.

9. The device of claim 1, further comprising each said pad fully occupying said associated depression and extending upwardly out of said associated depression.

10. A heel protecting vehicle floor mat device comprising:

a mat having an upper surface, a lower surface, and a perimeter edge extending around and between said upper surface and said lower surface, said mat having a front section, a back section, and a medial section positioned between said front section and said back section, said front section being narrower than said back section wherein said front section is configured for positioning on a floor of a vehicle such that said front section extends under pedals of the vehicle, said medial section tapering extending from said back section to said front section;

a plurality of pads coupled to said mat, said pads being positioned to extend across said medial section of said mat, said pads extending upwardly from said upper surface of said mat, said pads being positioned in spaced relationship to a front edge of said front section of said mat wherein said pads are configured for positioning to support a heel of a driver of the vehicle, each of said pads being resiliently compressible, each of said pads having an outer layer enveloping a core, said core being constructed of a gel material, said pads comprising a pair of interior pads, each of said interior pads having a rectangular shape, said pads comprising a pair of outer pads, each of said outer pads having a triangular shape, each of said pads having opposite ends extending beyond said medial section such that each of said opposite ends extends into one of said front section and said back section; and a plurality of depressions extending into said upper surface of said mat, each of said pads being positioned in an associated one of said depressions, each said pad fully occupying said associated depression and extending upwardly out of said associated depression.

\* \* \* \* \*